(12) United States Patent
Wan (10) Patent No.: US 11,562,736 B2
(45) Date of Patent: *Jan. 24, 2023

(54) SPEECH RECOGNITION METHOD, ELECTRONIC DEVICE, AND COMPUTER STORAGE MEDIUM

(71) Applicant: Tencent Technology (Shenzhen) Company Limited, Guangdong (CN)

(72) Inventor: Qiusheng Wan, Guangdong (CN)

(73) Assignee: TENCENT TECHNOLOGY (SHEN ZHEN) COMPANY LIMITED, Guangdong (CN)

( * ) Notice: Subject to any disclaimer, the term of this patent is extended or adjusted under 35 U.S.C. 154(b) by 63 days.

This patent is subject to a terminal disclaimer.

(21) Appl. No.: 17/244,737

(22) Filed: Apr. 29, 2021

(65) Prior Publication Data

US 2021/0249000 A1    Aug. 12, 2021

Related U.S. Application Data

(63) Continuation of application No. 16/442,193, filed on Jun. 14, 2019, now Pat. No. 11,043,211, which is a
(Continued)

(30) Foreign Application Priority Data

Feb. 15, 2017   (CN) .......................... 201710082111.5

(51) Int. Cl.
*G10L 15/00* (2013.01)
*G10L 15/18* (2013.01)
(Continued)

(52) U.S. Cl.
CPC .......... *G10L 15/1815* (2013.01); *G10L 15/02* (2013.01); *G10L 15/04* (2013.01);
(Continued)

(58) Field of Classification Search
None
See application file for complete search history.

(56) References Cited

U.S. PATENT DOCUMENTS 5,384,892 A ‡ 1/1995 Strong ................. G10L 15/193
704/243
6,424,946 B1 ‡ 7/2002 Tritschler ............. G06K 9/6226
704/272
(Continued)

FOREIGN PATENT DOCUMENTS

CN          103888606 A  ‡  6/2014
CN          104217152 A  ‡  12/2014
(Continued)

OTHER PUBLICATIONS

Written Opinion and International Search Report for PCT/CN2017/113154 dated Mar. 8, 2018 (10 pages) and machine translations (4 pages).
(Continued)

*Primary Examiner* — Richard Z Zhu
(74) *Attorney, Agent, or Firm* — Crowell & Moring LLP (57) ABSTRACT

A speech recognition method includes segmenting captured voice information to obtain a plurality of voice segments, and extracting voiceprint information of the voice segments; matching the voiceprint information of the voice segments with a first stored voiceprint information to determine a set of filtered voice segments having voiceprint information that successfully matches the first stored voiceprint information; combining the set of filtered voice segments to obtain combined voice information, and determining combined semantic information of the combined voice information; and using the combined semantic information as a speech recognition result when the combined semantic information satisfies a preset rule.

20 Claims, 6 Drawing Sheets

Related U.S. Application Data continuation of application No. PCT/CN2017/113154, filed on Nov. 27, 2017.

(51) Int. Cl.
*G10L 15/30* (2013.01)
*G10L 15/26* (2006.01)
*G10L 15/04* (2013.01)
*G10L 15/02* (2006.01)
*G10L 17/00* (2013.01)
*G10L 17/06* (2013.01)
*G10L 17/20* (2013.01)
*G10L 21/0272* (2013.01)
*G10L 17/02* (2013.01)

(52) U.S. Cl.
CPC .......... *G10L 15/1822* (2013.01); *G10L 15/26* (2013.01); *G10L 15/30* (2013.01); *G10L 17/00* (2013.01); *G10L 17/02* (2013.01); *G10L 17/06* (2013.01); *G10L 17/20* (2013.01); *G10L 21/0272* (2013.01)

(56) References Cited

U.S. PATENT DOCUMENTS

| | | | | |
|---|---|---|---|---|
| 6,434,520 | B1 ‡ | 8/2002 | Kanevsky | G10L 15/26 704/243 |
| 6,748,356 | B1 ‡ | 6/2004 | Beigi | G10L 17/04 704/245 |
| 8,612,224 | B2 ‡ | 12/2013 | Breslin | G10L 17/00 704/245 |
| 9,098,467 | B1 * | 8/2015 | Blanksteen | G10L 15/22 |
| 10,269,372 | B1 * | 4/2019 | Fiedler | G06F 3/167 |
| 2005/0154580 | A1 ‡ | 7/2005 | Horowitz | G06F 40/211 704/9 |
| 2009/0234651 | A1 ‡ | 9/2009 | Basir | G10L 15/28 704/254 |
| 2010/0086108 | A1 ‡ | 4/2010 | Jaiswal | G10L 17/00 379/88.04 |
| 2013/0006628 | A1 * | 1/2013 | Krishnaswamy | G10L 17/00 704/235 |
| 2015/0025887 | A1 ‡ | 1/2015 | Sidi | G10L 17/04 704/245 |
| 2015/0381801 | A1 * | 12/2015 | Rajakumar | H04M 3/436 379/88.01 |
| 2017/0193999 | A1 ‡ | 7/2017 | Aleksic | G10L 15/197 |
| 2018/0254051 | A1 ‡ | 9/2018 | Church | G10L 15/063 |
| 2018/0308487 | A1 ‡ | 10/2018 | Goel | G10L 15/26 |
| 2019/0392837 | A1 ‡ | 12/2019 | Jung | G06F 3/167 |

FOREIGN PATENT DOCUMENTS

| | | | |
|---|---|---|---|
| CN | 105931644 | A ‡ | 9/2016 |
| CN | 106297775 | A ‡ | 1/2017 |
| CN | 108447471 | A ‡ | 8/2018 |
| JP | 2004094158 | A ‡ | 3/2004 |

OTHER PUBLICATIONS

India Office Action issued in Indian Patent Application No. 201947022660 dated Sep. 30, 2020 (8 pages).

Notice of Preliminary Rejection issued in Korean Application No. 10-2019-7016994 dated Jul. 31, 2020 (3 pages).

\* cited by examiner
‡ imported from a related application

SPEECH RECOGNITION METHOD, ELECTRONIC DEVICE, AND COMPUTER STORAGE MEDIUM

RELATED APPLICATION

This application is a continuation of U.S. application Ser. No. 16/442,193, entitled "SPEECH RECOGNITION METHOD, ELECTRONIC DEVICE, AND COMPUTER STORAGE MEDIUM" filed on Jun. 14, 2019, which is a continuation of PTC application number PCT/CN2017/113154, entitled "VOICE RECOGNITION METHOD, ELECTRONIC DEVICE, AND COMPUTER STORAGE MEDIUM" filed on Nov. 27, 2017, which claims priority to Chinese Patent Application Number 201710082111.5, entitled "SPEECH RECOGNITION METHOD AND SPEECH RECOGNITION APPARATUS" filed with the Chinese Patent Office on Feb. 15, 2017, each of which are incorporated herein by reference in its entirety.

FIELD OF THE TECHNOLOGY

The present disclosure relates to the field of computer information processing technologies, and in particular, to a speech recognition method, an electronic device, and a computer storage medium.

BACKGROUND OF THE DISCLOSURE

With development of intelligent technologies, performing speech recognition and performing control according to recognized voice has become important content in application of intelligent technologies, and speech recognition technologies are applied to various intelligent products to implement intelligent control. As the number of intelligent products are increased and the requirements for accuracy of speech recognition are increasingly high, various speech recognition technologies emerge one after another.

Currently, a common speech recognition manner is to extract characteristics of to-be-recognized voice information sent by a user, and then, recognize the to-be-recognized voice information sent by the user according to a recognition algorithm. However, when a speech recognition function is used in an occasion where multiple people speak (for example, in a vehicle), captured to-be-recognized voice information may include voices of the multiple people. Although the to-be-recognized voice information of only one person is meant to be effective, because of the existence of noises made by others, a correct meaning cannot be obtained through recognition. Consequently, the accuracy of speech recognition is insufficient.

SUMMARY

According to various embodiments, a speech recognition method, an electronic device, and a computer storage medium are provided.

A speech recognition method includes the following steps:

obtaining captured to-be-recognized voice information, and determining semantic information of the to-be-recognized voice information;

segmenting the to-be-recognized voice information to obtain respective voice segments when the semantic information does not satisfy a preset rule, and extracting voiceprint information of the respective voice segments;

obtaining a piece of unmatched voiceprint information from a local voiceprint database as to-be-matched voiceprint information when there is unmatched voiceprint information in the local voiceprint database;

matching the voiceprint information of the respective voice segments with the to-be-matched voiceprint information to determine, in the voiceprint information of the respective voice segments, filtered voiceprint information that successfully matches the to-be-matched voiceprint information;

combining voice segments corresponding to each piece of filtered voiceprint information to obtain combined voice information, and determining combined semantic information of the combined voice information; and using the combined semantic information as a speech recognition result when the combined semantic information satisfies the preset rule.

An electronic device includes: a memory and a processor, the memory storing computer readable instructions, and the computer readable instructions, when being executed by the processor, causing the processor to perform the following steps:

obtaining captured to-be-recognized voice information, and determining semantic information of the to-be-recognized voice information;

segmenting the to-be-recognized voice information to obtain respective voice segments when the semantic information does not satisfy a preset rule, and extracting voiceprint information of the respective voice segments;

obtaining a piece of unmatched voiceprint information from a local voiceprint database as to-be-matched voiceprint information when there is unmatched voiceprint information in the local voiceprint database;

matching the voiceprint information of the respective voice segments with the to-be-matched voiceprint information to determine, in the voiceprint information of the respective voice segments, filtered voiceprint information that successfully matches the to-be-matched voiceprint information;

combining voice segments corresponding to each piece of filtered voiceprint information to obtain combined voice information, and determining combined semantic information of the combined voice information; and using the combined semantic information as a speech recognition result when the combined semantic information satisfies the preset rule.

A computer storage medium stores a computer program, the computer program, when being executed by a processor, performing the sticker processing method according to any one of the foregoing.

Details of one or more embodiments of this application are provided in the following accompanying drawings and descriptions. Additional features, objectives, and advantages of the present disclosure will be apparent from the specification, accompanying drawings, and claims.

BRIEF DESCRIPTION OF THE DRAWINGS

To describe the technical solutions of the embodiments of this application or the existing technology more clearly, the following briefly introduces the accompanying drawings required for describing the embodiments or the existing technology. Apparently, the accompanying drawings in the following description show only some embodiments of this application, and a person of ordinary skill in the art may still derive other drawings from these accompanying drawings without creative efforts.

DESCRIPTION OF EMBODIMENTS

To make objectives, technical solutions and advantages of the present disclosure more understandable and comprehensible, the present disclosure is further described in detail below with reference to accompanying drawings and embodiments. It should be understood that the specific embodiments described herein are merely used for explaining the present disclosure, but the present disclosure is not limited to those specific embodiments.

Figure 1:
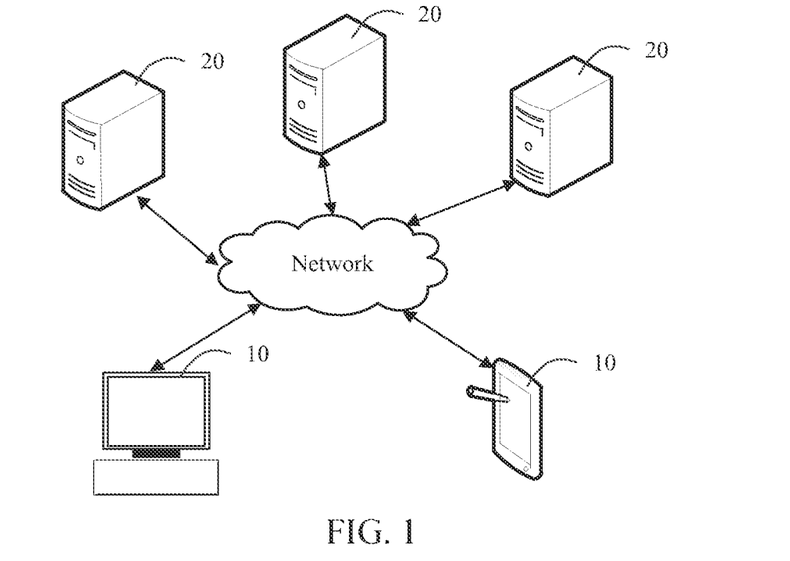
FIG. 1 is a schematic diagram of an application environment of a speech recognition method in an embodiment.

FIG. 1 is a schematic diagram of an application environment of a speech recognition method in various embodiments. Referring to FIG. 1, the speech recognition method is applied to a speech recognition system. The speech recognition system includes a terminal 10 and servers 20. The terminal 10 may communicate with the servers 20 through a network. The terminal 10 may recognize voice information to obtain semantic information, and then, further process the semantic information to determine a speech recognition result, or may upload obtained voice information to a corresponding server 20 through the network. The server 20 may recognize the voice information uploaded by the terminal 10, and may send a recognition result to the terminal 10 through the network. The terminal 10 uses the received recognition result as semantic information, and determines a speech recognition result according to the received semantic information. The terminal 10 may generate a corresponding instruction according to the speech recognition result to perform a subsequent relevant operation, to implement intelligent voice control. The terminal 10 may be any device capable of implementing intelligent input/output and speech recognition, for example, a desktop terminal or a mobile terminal. The mobile terminal may be a smartphone, a tablet computer, an in-vehicle computer, a wearable intelligent device, or the like. The server 20 may be a server on which a platform that receives voice information and performs speech recognition is located. The server may be implemented as an independent server or a server cluster constituted by a plurality of servers.

Figure 2:
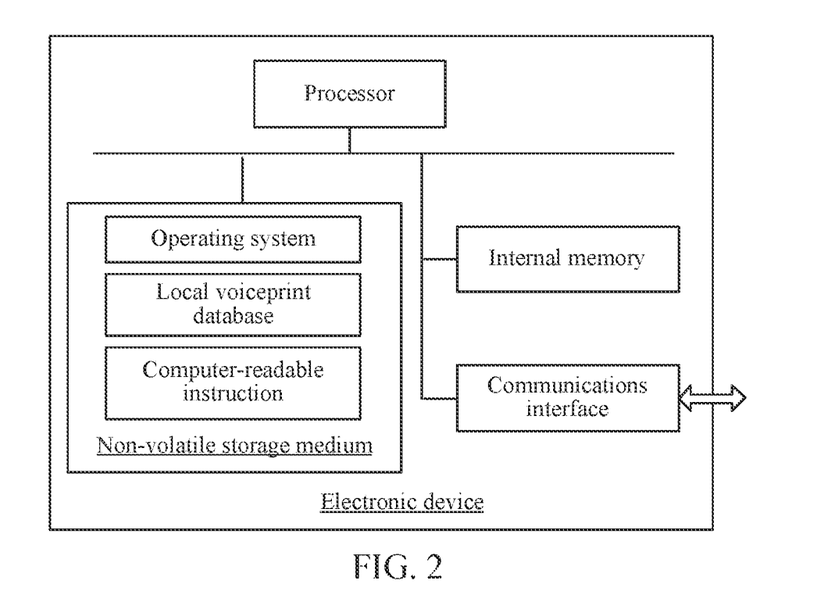
FIG. 2 is a schematic diagram of an inner structure of an electronic device in an embodiment.

As shown in FIG. 2, in various embodiments, an electronic device is provided, and it may be the terminal 10 in FIG. 1. The electronic device may include a processor, a non-volatile storage medium, an internal memory, and a communications interface that are connected through a system bus. The non-volatile storage medium of the electronic device stores an operating system, a local voiceprint database, and computer-readable instructions. The local voiceprint database stores voiceprint information. The computer-readable instructions may be used for implementing a speech recognition method. The processor of the electronic device is configured to provide calculation and control capabilities, to support running of the entire electronic device. The internal memory of the electronic device may store computer-readable instructions. When executed by the processor, the computer-readable instructions may enable the processor to perform a speech recognition method. The communications interface is configured to communicate with the server 20. A person skilled in the art may understand that, the structure shown in FIG. 2 is merely a block diagram of a partial structure related to the solutions of this application, and does not constitute a limitation to the electronic device to which the solutions of this application are applied, and a specific electronic device may include more or fewer components than those shown in the figure, or some components may be combined, or a different component arrangement may be used.

Figure 3:
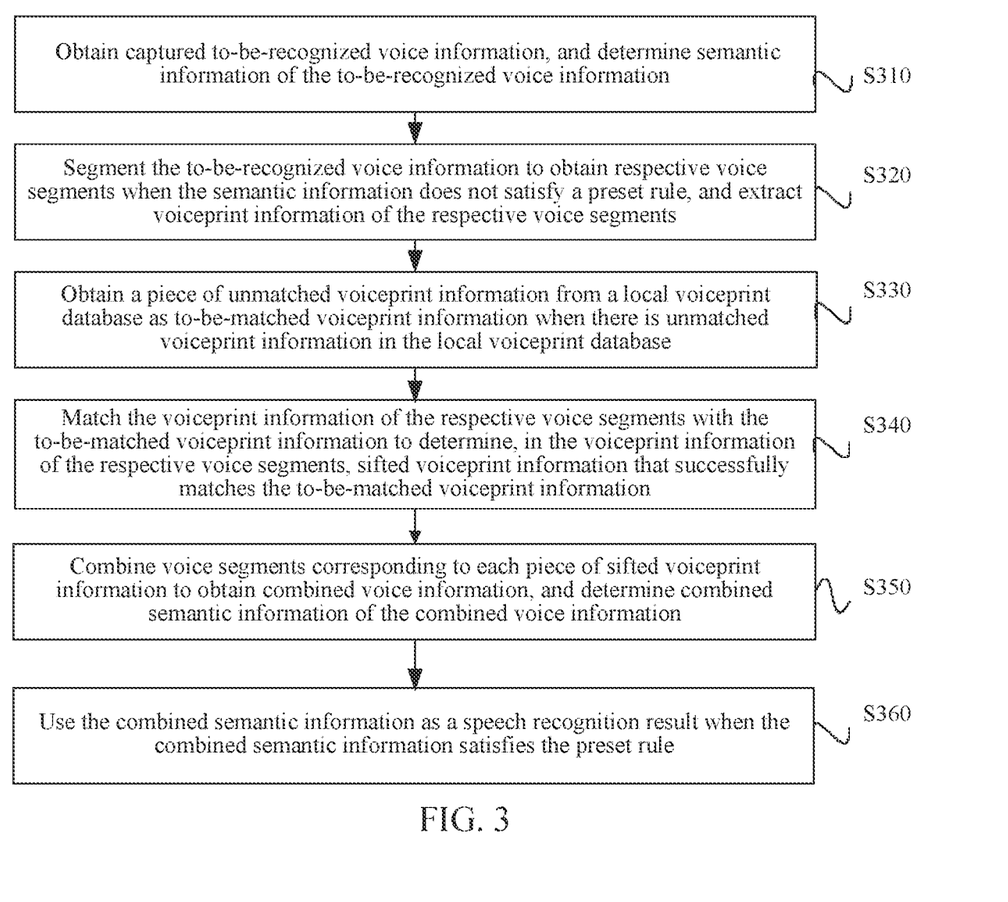
FIG. 3 is a schematic flowchart of a speech recognition method in an embodiment.

As shown in FIG. 3, in one of the embodiments, a speech recognition method is provided. In this embodiment, applying the method to the terminal 10 shown in FIG. 1 is used as an example for description. The method specifically includes step S310 to step S360 as follows:

S310: Obtain captured to-be-recognized voice information, and determine semantic information of the to-be-recognized voice information.

In this embodiment, the voice information may be audio information input by a user through a voice input apparatus of the terminal. That is, voice information of the user may be captured by using the voice input apparatus, and after to-be-recognized voice information has been captured, the captured to-be-recognized voice information may be obtained. The voice input apparatus may include, but is not limited to, a microphone. The to-be-recognized voice information is voice information that needs to be recognized to obtain semantic information thereof. The semantic information may be text information. Speech recognition is performed on the to-be-recognized voice information to obtain corresponding semantic information, so that the semantic information of the to-be-recognized voice information can be determined. That is, a meaning expressed by the user that inputs the to-be-recognized voice information is determined.

S320: Segment the to-be-recognized voice information to obtain respective voice segments when the semantic information does not satisfy a preset rule, and extract voiceprint information of the respective voice segments.

After the semantic information of the to-be-recognized voice information is determined, whether the semantic information satisfies the preset rule needs to be determined. In this embodiment, the preset rule may be a preset requirement on semantic information. That is, when the semantic information does not satisfy the preset rule, it indicates that the semantic information does not satisfy a requirement on the semantic information, and the semantic information is considered to be inaccurate. For example, because audio is recognized, generally, when a user accurately expresses content that the user wants to express through audio, corresponding voice information should satisfy normal grammatical requirements on speech, so that satisfying the preset rule may be that the semantic information satisfies a preset grammatical rule.

On the other hand, the terminal for implementing the speech recognition method of this embodiment may include multiple work modes. The work modes may include, but are not limited to, a navigation mode, a music mode, a broadcast mode, and a program mode. Working in different work modes, the terminal may satisfy different user requirements, and each work mode has its corresponding lexicon. The lexicon includes corresponding words that may be used in the work mode. After the semantic information is determined, whether one or more keywords obtained after semantic information segmentation are in the lexicon may be further determined, and if yes, it indicates that the semantic information of the to-be-recognized voice information of the user is one or more words that may be used in the work mode of the terminal.

Accordingly, in this embodiment, the preset rule may be that the semantic information satisfies the preset grammatical rule and the semantic information is in a single lexicon. When the semantic information does not satisfy the preset rule, it is considered that the semantic information obtained by recognizing the to-be-recognized voice information cannot be accurately recognized by the terminal, and therefore, cannot be converted into a corresponding instruction for performing a corresponding operation. On the other hand, the preset rule may alternatively be that the semantic information satisfies the preset grammatical rule, the semantic information is in a single lexicon, and the semantic information has a corresponding instruction. When the semantic information satisfies the preset grammatical rule and the semantic information is a single lexicon, but the semantic information cannot be converted into an effective instruction, that is, the semantic information does not have a corresponding instruction, it is considered that the semantic information sill does not satisfy the preset rule.

In a specific application example, for example, determined semantic information is "I want hello to play music". A user A correspondingly says: "I want to play music", but during a speaking process of the user A, a user B interposes "hello" behind "I want" of the user A. Although "play music" is in a lexicon corresponding to the music mode, the grammar of the whole sentence does not conform to normal human grammar, and therefore, it can be considered that the semantic information does not satisfy the preset rule. For another example, semantic information is "hello", which not only satisfies the preset grammatical rule, but also is in a lexicon. However, the semantic information is essentially a greeting rather than a control statement. The terminal does not have an instruction corresponding to "hello". That is, an instruction for performing a corresponding operation cannot be generated. It may alternatively be considered that the semantic information does not satisfy the preset rule.

When it is determined that the semantic information does not satisfy the preset rule, it is considered that the semantic information is inaccurate, and to improve recognition accuracy, the to-be-recognized voice information needs to be segmented to obtain respective voice segments and voiceprint information of the respective voice segments is extracted. Because each person has unique voiceprint information, different voice information of the same person corresponds to the same voiceprint information. For example, a user A says different voice information, but since the different voice information is said by the same user A, the different voice information has the same voiceprint information. To improve accuracy, voice information of a single person may be determined by determining voiceprint information.

S330: Obtain a piece of unmatched voiceprint information from a local voiceprint database as to-be-matched voiceprint information when there is unmatched voiceprint information in the local voiceprint database.

The local voiceprint database may store voiceprint information, and the voiceprint information stored in the local voiceprint database may be voiceprint information of a user that has performed voice interaction with the terminal, where semantic information corresponding to the voiceprint information satisfies the preset rule at least once. When semantic information corresponding to the respective voice segments is matched with the unmatched voiceprint information stored in the local voiceprint database, first, a piece of unmatched voiceprint information needs to be obtained from the local voiceprint database as to-be-matched voiceprint information. That is, when the voiceprint information of the respective voice segments is matched with the voiceprint information in the local voiceprint database, each time a single piece of to-be-matched voiceprint information in the local voiceprint database is matched with the voiceprint information of the respective voice segment, so as to filter voice information of a single user.

S340: Match the voiceprint information of the respective voice segments with the to-be-matched voiceprint information to determine, in the voiceprint information of the respective voice segments, filtered voiceprint information that successfully matches the to-be-matched voiceprint information.

The voice information may include voices of a plurality of users. After a piece of unmatched to-be-matched voiceprint information is selected from the local voiceprint database, that is, after voiceprint information of one user is selected, the voiceprint information of the respective voice segments is matched with the to-be-matched voiceprint information, and because the same user has the same voiceprint information, the voiceprint information that is in the voiceprint information of the respective voice segments and that successfully matches the to-be-matched voiceprint information is voiceprint information of the same user. That is, the filtered voiceprint information is the voiceprint information of the user corresponding to the to-be-matched voiceprint information.

S350: Combine voice segments corresponding to each piece of filtered voiceprint information to obtain combined voice information, and determine combined semantic information of the combined voice information.

Because each piece of the filtered voiceprint information is from the same user, voice segments corresponding to each piece of the filtered voiceprint information may be combined. That is, voice segments of the same user are combined, and the obtained combined voice information is the voice of the same user. Then, the combined semantic information of the combined voice information is determined, and the combined semantic information is an accurately expressed meaning corresponding to the to-be-recognized voice information of the user.

S360: Use the combined semantic information as a speech recognition result when the combined semantic information satisfies the preset rule.

After the combined semantic information is obtained, although the combined semantic information is the accurately expressed meaning corresponding to the to-be-recognized voice information of the user, the voice information may be voices of a plurality of the user, and it is likely that the combined semantic information of the combined voice information obtained through the foregoing steps does not satisfy the preset rule. To further improve accuracy, whether the combined voice information satisfies the preset rule needs to be determined, and when the combined voice information satisfies the preset rule, it further indicates that the semantic information is accurate, and in this case, the combined semantic information may be used as a speech recognition result, to achieve a speech recognition purpose. Subsequently, a corresponding instruction may be generated according to the speech recognition result, and a corresponding operation may be performed according to the instruction.

For example, the semantic information is "I want hello to play music", and if the selected to-be-matched voiceprint information is voiceprint information of a user A, and voiceprint information of the voice segments "I want" and "to play music" successfully matches the voiceprint information of the user A, that is, the filtered voiceprint information is the voiceprint information of the voice segments of "I want" and "to play music", the voice segments "I want" and "to play music" are combined as final combined voice information, and the combined voice information is determined to be "I want to play music", which not only satisfies the preset grammatical requirements, but also is in a lexicon, and in addition, is a piece of semantic information that requires a music playing operation to be performed and has a corresponding instruction. That is, a music playing operation may be performed according to the instruction, it is considered that the combined semantic information satisfies the preset rule, and "I want to play music" is used as the speech recognition result. Subsequently, a music playing instruction corresponding thereto may be generated for performing the music playing operation.

In the foregoing speech recognition method, semantic information of to-be-recognized voice information is first determined; when the semantic information does not satisfy a preset rule, it indicates that the recognized semantic information may be inaccurate, and in this case, the to-be-recognized voice information is segmented to obtain respective voice segments, and voiceprint information of the respective voice segments is extracted; a piece of unmatched voiceprint information is obtained from a local voiceprint database as to-be-matched voiceprint information when there is unmatched voiceprint information in the local voiceprint database, to provide a basis for subsequent voiceprint matching, that is, providing to-be-matched voiceprint information of a single user for voiceprint matching. Then, the voiceprint information of the respective voice segments is matched with the to-be-matched voiceprint information to determine, in the voiceprint information of the respective voice segments, filtered voiceprint information that successfully matches the to-be-matched voiceprint information, that is, voiceprint information of a single user that matches the to-be-matched voiceprint information is filtered; voice segments corresponding to each piece of filtered voiceprint information are combined to obtain combined voice information, and the combined voice information is recognized to obtain combined semantic information, so as to obtain a meaning expressed by the single user. To improve recognition accuracy, whether the combined semantic information satisfies the preset rule also needs to be determined. If the combined semantic information satisfies the preset rule, it indicates that an accurately recognized meaning is obtained, that is, a meaning that the user wants to express is accurately obtained, and in this case, the combined semantic information is used as a speech recognition result, thereby improving speech recognition accuracy.

In one of the embodiments, the foregoing speech recognition method further includes a step of: returning, when the combined semantic information does not satisfy the preset rule, to the step of obtaining a piece of unmatched voiceprint information from a local voiceprint database as to-be-matched voiceprint information when there is unmatched voiceprint information in the local voiceprint database.

When the combined semantic information does not satisfy the preset rule, it indicates that the combined voice information does not satisfy a requirement on the combined semantic information, and it is considered that the semantic information is inaccurate. voiceprint information of a next user needs to be matched. For example, semantic information is "I want hello to play music". If selected to-be-matched voiceprint information is voiceprint information of a user B, and voiceprint information of a voice segment "hello" successfully matches the voiceprint information of the user B, that is, the filtered voiceprint information is the voiceprint information of the voice segment "hello", the voice segment "hello" may be used as final combined voice information, and the combined voice information is determined to be "hello". Although the combined voice information satisfies preset grammatical requirements and is in a lexicon, the combined voice information does not have a corresponding instruction, that is, no instruction for performing an operation can be generated. Therefore, the combined voice information may also be considered to not satisfy the preset rule, and in this case, the step of obtaining a piece of unmatched voiceprint information from a local voiceprint database as to-be-matched voiceprint information when there is unmatched voiceprint information in the local voiceprint database needs to be returned to, to obtain a next piece of unmatched voiceprint information as to-be-matched voiceprint information and continue to perform a voiceprint matching process.

Figure 4:
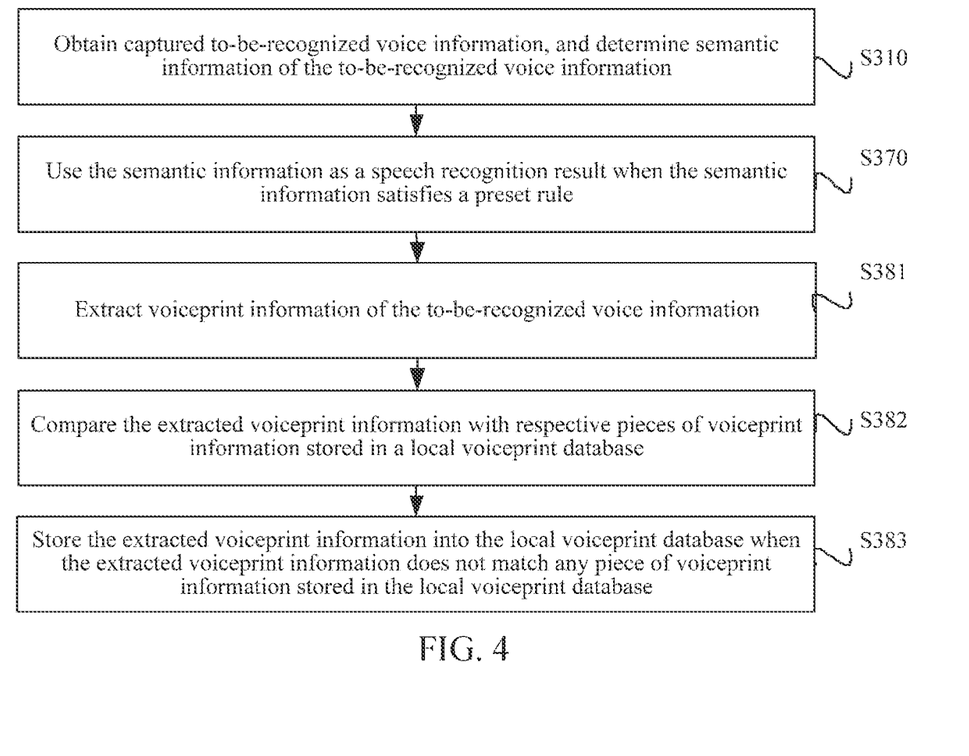
FIG. 4 is a schematic flowchart of a speech recognition method in another embodiment.

As shown in FIG. 4, in one of the embodiments, the foregoing speech recognition method further includes the following step:

S370: Use the semantic information as a speech recognition result when the semantic information satisfies the preset rule.

When the semantic information satisfies the preset rule, it indicates that the semantic information satisfies a requirement on the semantic information, it is considered that the semantic information is accurate, and the semantic information is used as a speech recognition result, so that a relatively accurate speech recognition result may be obtained, thereby improving speech recognition accuracy.

Still referring to FIG. 4, in one of the embodiments, after the semantic information is used as a speech recognition result when the semantic information satisfies the preset rule, the method may further include the following steps:

S381: Extract voiceprint information of the to-be-recognized voice information.

S382: Compare the extracted voiceprint information with respective pieces of voiceprint information stored in the local voiceprint database.

S383: Store the extracted voiceprint information into the local voiceprint database when the extracted voiceprint information does not match any piece of voiceprint information stored in the local voiceprint database.

If the semantic information satisfies the preset rule, it is considered that the semantic information is relatively accurate, and after the semantic information is used as the speech recognition result, voiceprint information of the to-be-recognized voice information may be further extracted, and the voiceprint information is stored into the local voiceprint database. Specifically, before storage, the voiceprint information needs to be compared with the respective pieces of voiceprint information stored in the local voiceprint database, that is, perform comparison to determine whether voiceprint information matching the extracted voiceprint information exists in the respective pieces of voiceprint information stored in the local voiceprint database. If the voiceprint information does not exist, that is, the extracted voiceprint information does not match any piece of voiceprint information stored in the local voiceprint database, it indicates that a user corresponding to the extracted voiceprint information performs voice interaction with the terminal for the first time, the corresponding voice information satisfies the preset rule, and therefore, the extracted voiceprint information is stored into the local voiceprint database.

In one of the embodiments, a manner of storing the voiceprint information into the local voiceprint database includes establishing a user identifier of the extracted voiceprint information; and storing the extracted voiceprint information and the corresponding user identifier in association into the local voiceprint database, and initializing a priority level of the user identifier to an initial level.

The user identifier is an identifier that can uniquely specify a user identity and may be a character string including characters of a type of at least one of a numeral, a letter, and a punctuation. The user identifier corresponds to the voiceprint information. That is, the voiceprint information is corresponded to a speaker. When the extracted voiceprint information does not match any piece of voiceprint information stored in the local voiceprint database, it indicates that the user corresponding to the extracted voiceprint information performs voice interaction for the first time, and the semantic information satisfies a preset requirement. A user identifier of the extracted voiceprint information is established, the extracted voiceprint information and the corresponding user identifier are stored in association into the local voiceprint database, and a priority level of the user identifier is initialized to an initial level. For example, the initial level is 1, it indicates that its level is the lowest level. If a priority level is higher, it indicates that the user performs voice interaction for a larger number of times, and voiceprint information corresponding to the user is more important.

In one of the embodiments, the foregoing speech recognition method may further include a step of: increasing the priority level of the user identifier corresponding to the extracted voiceprint information by a preset level when the extracted voiceprint information successfully matches the voiceprint information stored in the local voiceprint database.

When the extracted voiceprint information successfully matches voiceprint information stored in the local voiceprint database, it indicates that the extracted voiceprint information has been stored before, it represents that the user corresponding to the extracted voiceprint information has performed voice interaction with the terminal, and the corresponding semantic information satisfies the preset rule, instead of the user performing voice interaction for the first time. In this case, the priority level of the user identifier corresponding to the extracted voiceprint information is increased by the preset level, to improve importance of the voiceprint information of the user. Specifically, the preset level may be 1. For example, if an original priority level of the user identifier corresponding to the extracted voiceprint information is 1, and an increased preset level is 1, the priority level changes to 2.

In one of the embodiments, a user identifier is further established in the local voiceprint database, and voiceprint information stored in the local voiceprint database corresponds to the user identifier.

According to the above, a manner of obtaining a piece of unmatched voiceprint information from the local voiceprint database as to-be-matched voiceprint information may include: obtaining, according to a preset level order of a priority level of the user identifier, in the local voiceprint database, voiceprint information corresponding to an unmatched user identifier as to-be-matched voiceprint information.

In this way, voiceprint information corresponding to an unmatched user identifier may be obtained in an ordered fashion from the local voiceprint database as to-be-matched voiceprint information rather than being selected disorderly, to effectively prevent an error.

In one of the embodiments, the preset level order may include a descending order of priority levels or an ascending order of priority levels.

If a priority level of a user identifier is higher, corresponding voiceprint information is more important, that is, a user performs control with voice more frequently. For example, in a motor vehicle, a terminal is an in-vehicle computer, generally, a vehicle owner performs voice control most frequently, and if a priority level is higher, importance is higher, and a user corresponding to to-be-recognized voice information is more likely to be the vehicle owner. Therefore, when to-be-matched voiceprint information is selected in descending order of priority levels, not only voiceprint matching can be performed orderly to prevent an error, but also overall recognition efficiency can be improved. In addition, when the preset level order is an ascending order of priority levels, to-be-matched voiceprint information can be orderly selected, to effectively perform voiceprint matching and prevent an error.

In one of the embodiments, the foregoing speech recognition method may further include a step of: providing recognition error prompt information when the combined semantic information does not satisfy the preset rule, and no unmatched voiceprint information exists in the local voiceprint database.

When the combined semantic information does not satisfy the preset rule, it indicates that the combined semantic information is inaccurate. For accurate recognition, a next piece of unmatched voiceprint information needs to be selected. However, no unmatched voiceprint information exists in the local voiceprint database, indicating that all pieces of voiceprint information in the local voiceprint database have been matched with, and voiceprint information matching ends. In this case, recognition error prompt information is provided, to inform the user of this speech recognition failure, so as to help the user quickly enter a next voice control process.

In one of the embodiments, after semantic information of the to-be-recognized voice information is determined, and before the to-be-recognized voice information is segmented, the method further includes a step of: extracting one or more keywords of the semantic information.

It is determined that the semantic information does not satisfy the preset rule when the semantic information does not satisfy a preset grammatical rule, the keywords of the semantic information do not exist in one lexicon at the same time, or an instruction corresponding to the one or more keywords of the semantic information does not exist in a local instruction library.

Each work mode has its corresponding lexicon. That is, a work mode corresponds to a lexicon. When whether the semantic information satisfies the preset rule is determined, whether the semantic information satisfies a preset grammatical rule is first determined. If the semantic information satisfies the preset grammatical rule, whether one or more keywords of the semantic information are in one lexicon at the same time is checked because there is a plurality of lexicons in a plurality of work modes, and the keywords may be distributed in various lexicons. Because one voice can only be used to perform, in one work mode, a relevant operation corresponding to the work mode, if the keywords are distributed in respective lexicons, it indicates that the one or more keywords of the semantic information do not satisfy the preset rule. In addition, a local instruction library is configured to store an instruction for controlling or performing a relevant operation. Specifically, the one or more keywords of the semantic information and the instruction are stored in association, the corresponding instruction can be found by using the one or more keywords of the semantic information, and subsequently, a corresponding operation is performed according to the instruction. If the semantic information satisfies the preset grammatical rule, and the corresponding keywords are all in one lexicon, but no instruction corresponding to the one or more keywords exists in the local instruction, it indicates that the voice information is still ineffective, and no corresponding instruction can be obtained. That is, voice control cannot be achieved. For example, semantic information is "hello", which not only satisfies the preset grammatical rule, but also exists in one lexicon. However, the semantic information is a simple greeting rather than a control statement. No instruction that corresponds to "hello" and according to which a corresponding operation can be performed exists in the local instruction library.

In this embodiment, after combined semantic information of the combined voice information is determined, and before the combined semantic information is used as a speech recognition result, the method further includes a step of: extracting one or more keywords of the combined semantic information.

It is determined that the combined semantic information satisfies the preset rule that when the combined semantic information satisfies the preset grammatical rule, the keywords of the combined semantic information exist in one lexicon at the same time, and an instruction corresponding to the keywords of the combined semantic information exist in the local instruction library.

When the combined semantic information satisfies the preset grammatical rule, the keywords of the combined semantic information exist in one lexicon at the same time, and an instruction corresponding to the keywords of the combined semantic information exist in the local instruction library, it is considered that the combined semantic information satisfies the preset rule, and in this case, the combined semantic information is used as a speech recognition result. Because an instruction corresponding to the one or more keywords of the combined semantic meaning can be found in the local instruction library, subsequently, a relevant operation can be performed according to the instruction. For example, combined semantic information is "I want to play music", and satisfies the preset grammatical rule. If keywords thereof are "play" and "music", the keywords exist in a lexicon corresponding to a music mode at the same time, and an instruction corresponding to "play" exists in the local instruction library, it is considered that "I want to play music" satisfies the preset rule, and a corresponding play instruction can be found in the local instruction library for music playing.

In one of the embodiments, a manner of determining semantic information of the to-be-recognized voice information may include:

performing speech recognition on the to-be-recognized voice information, to obtain the semantic information. When the to-be-recognized voice information is recognized, the to-be-recognized voice information may be recognized locally on the terminal, that is, speech recognition is performed on the to-be-recognized voice information, to obtain the semantic information, so that efficiency of obtaining semantic information is improved, thereby improving overall speech recognition efficiency.

In one of the embodiments, a manner of determining semantic information of the to-be-recognized voice information may include:

sending the to-be-recognized voice information to a cloud server; and receiving a recognition result of performing, by the cloud server, speech recognition on the to-be-recognized voice information, and using the recognition result as semantic information.

Therefore, recognition may alternatively be performed through the cloud server. That is, the to-be-recognized voice information is sent to the cloud server. The cloud server uses a recognition result of performing speech recognition on the to-be-recognized voice information as semantic information. Because the cloud server may store a large amount of data according to which recognition can be performed, recognition accuracy can be improved.

Figure 5:
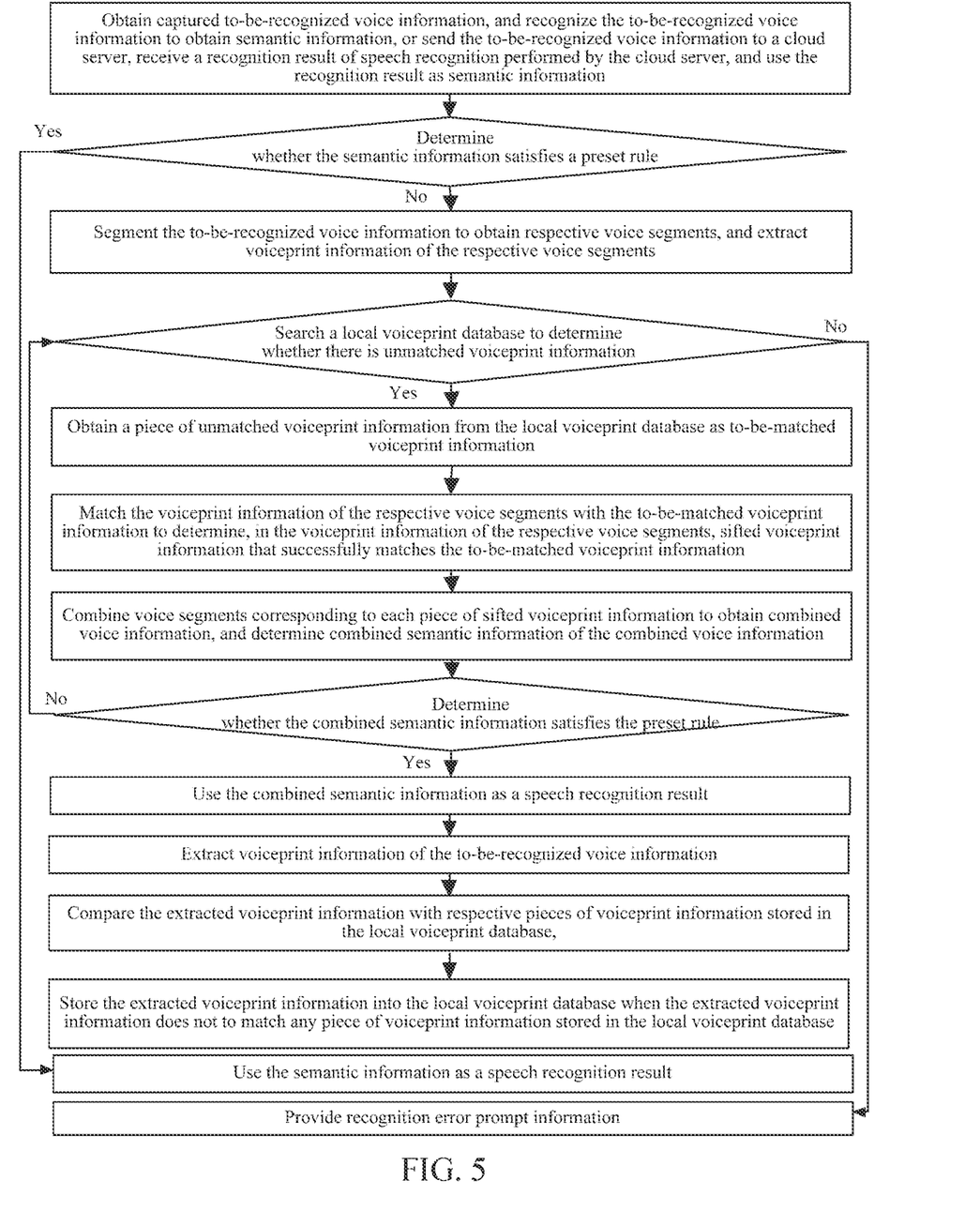
FIG. 5 is a schematic flowchart of a speech recognition method in a specific embodiment.

The foregoing speech recognition method is described below in detail by using a specific embodiment. FIG. 5 is a flowchart of a speech recognition method in a specific embodiment.

First, captured to-be-recognized voice information is obtained, and the to-be-recognized voice information is recognized to obtain semantic information, or is sent to a cloud server, a recognition result of speech recognition performed by the cloud server is received, and the recognition result is used as semantic information. Then, whether the semantic information satisfies a preset rule is determined, the to-be-recognized voice information is segmented to obtain respective voice segments if the semantic information does not satisfy the preset rule, and voiceprint information of the respective voice segments is extracted; a local voiceprint database is searched for unmatched voiceprint information, and a piece of unmatched voiceprint information is obtained from the local voiceprint database as to-be-matched voiceprint information when there is unmatched voiceprint information in the local voiceprint database; the voiceprint information of the respective voice segments is matched with the to-be-matched voiceprint information to determine, in the voiceprint information of the respective voice segments, filtered voiceprint information that successfully matches the to-be-matched voiceprint information; voice segments corresponding to each piece of filtered voiceprint information are combined to obtain combined voice information, and combined semantic information of the combined voice information is determined; whether the combined semantic information satisfies the preset rule is further determined, and the combined semantic information is used as a speech recognition result when the combined semantic information satisfies the preset rule; subsequently, voiceprint information of the to-be-recognized voice information may be extracted; the extracted voiceprint information is compared with respective pieces of voiceprint information stored in the local voiceprint database; and the extracted voiceprint information is stored into the local voiceprint database when the extracted voiceprint information does not match any piece of voiceprint information stored in the local voiceprint database. In addition, the priority level of the user identifier corresponding to the extracted voiceprint information is increased by a preset level when the extracted voiceprint information successfully matches the voiceprint information stored in the local voiceprint database.

In addition, the step of searching a local voiceprint database to determine whether there is unmatched voiceprint information is returned to when the combined semantic information does not satisfy the preset rule, and further, a next piece of unmatched voiceprint information is obtained from the local voiceprint database as to-be-matched voiceprint information when there is unmatched voiceprint information in the local voiceprint database. Recognition error prompt information is provided when there is no unmatched voiceprint information in the local voiceprint database. The semantic information is used as a speech recognition result when the semantic information satisfies the preset rule.

Figure 6:
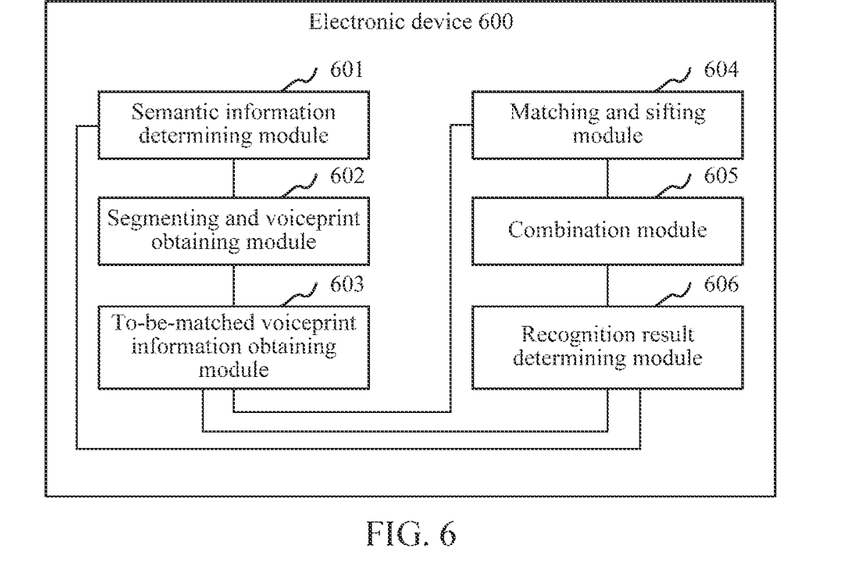
FIG. 6 is a structural block diagram of an electronic device in an embodiment.

As shown in FIG. 6, in one of the embodiments, this application further provides an electronic device 600, and an internal structure of the electronic device 600 may correspond to a structure as shown in FIG. 2, and all or some of following modules below may be implemented by using software, hardware, or a combination thereof. The electronic device 600 includes a semantic information determining module 601, a segmenting and voiceprint obtaining module 602, a to-be-matched voiceprint information obtaining module 603, a matching and filtering module 604, a combination module 605, and a recognition result determining module 606.

The semantic information determining module 601 is configured to obtain captured to-be-recognized voice information, and determine semantic information of the to-be-recognized voice information.

The segmenting and voiceprint obtaining module 602 is configured to segment the to-be-recognized voice information to obtain respective voice segments when the semantic information does not satisfy a preset rule, and extract voiceprint information of the respective voice segments.

The to-be-matched voiceprint information obtaining module 603 is configured to obtain a piece of unmatched voiceprint information from the local voiceprint database as to-be-matched voiceprint information when there is unmatched voiceprint information in a local voiceprint database.

The matching and filtering module 604 is configured to match the voiceprint information of the respective voice segments with the to-be-matched voiceprint information to determine, in the voiceprint information of the respective voice segments, filtered voiceprint information that successfully matches the to-be-matched voiceprint information.

The combination module 605 is configured to combine voice segments corresponding to each piece of filtered voiceprint information to obtain combined voice information, and determine combined semantic information of the combined voice information.

The recognition result determining module 606 is configured to use the combined semantic information as a speech recognition result when the combined semantic information satisfies the preset rule.

In the foregoing electronic device, semantic information of to-be-recognized voice information is first determined; when the semantic information does not satisfy a preset rule, it indicates that the recognized semantic information may be inaccurate, and in this case, the to-be-recognized voice information is segmented to obtain respective voice segments, and voiceprint information of the respective voice clip is extracted; a piece of unmatched voiceprint information is obtained from a local voiceprint database as to-be-matched voiceprint information when there is unmatched voiceprint information in the local voiceprint database, to provide a basis for subsequent voiceprint matching, that is, providing to-be-matched voiceprint information of a single user for voiceprint matching; then, the voiceprint information of the respective voice segments is matched with the to-be-matched voiceprint information to determine, in the voiceprint information of the respective voice segments, filtered voiceprint information that successfully matches the to-be-matched voiceprint information; that is, voiceprint information of the single user matching the foregoing to-be-matched voiceprint information is filtered from the voiceprint information of the respective voice segments; voice segments corresponding to each piece of filtered voiceprint information are combined to obtain combined voice information, that is, to obtain combined voice information of the single user, and the combined voice information is recognized to obtain combined semantic information, to obtain a meaning expressed by the single user, to improve recognition accuracy, whether the combined semantic information satisfies the preset rule also needs to be determined, and if the combined semantic information satisfies the preset rule, it indicates that an accurately recognized meaning is obtained, that is, a meaning that the user wants to express is accurately obtained, and in this case, the combined semantic information is used as a speech recognition result, thereby improving speech recognition accuracy.

In one of the embodiments, the foregoing recognition result determining module 606 is further configured to return, when the combined semantic information does not satisfy the preset rule, to obtaining a piece of unmatched voiceprint information from a local voiceprint database as to-be-matched voiceprint information when the to-be-matched voiceprint information obtaining module 603 determines that there is unmatched voiceprint information in the local voiceprint database.

In one of the embodiments, the foregoing recognition result determining module 606 is configured to use semantic information as a speech recognition result when the semantic information satisfies the preset rule.

Figure 7:
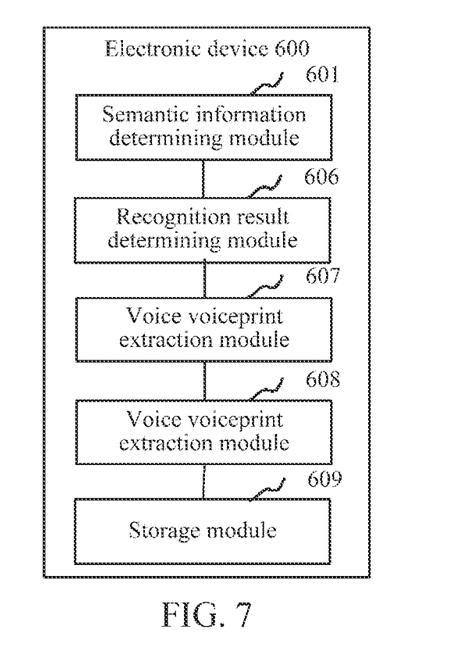
FIG. 7 is a structural block diagram of an electronic device in another embodiment.

As shown in FIG. 7, in one of the embodiments, the electronic device 600 further includes:

a voice voiceprint extraction module 607, configured to extract voiceprint information of the to-be-recognized voice information after the recognition result determining module 606 uses semantic information as a speech recognition result when the semantic information satisfies the preset rule;

a voiceprint comparison module 608, configured to compare the extracted voiceprint information with respective pieces of voiceprint information stored in the local voiceprint database; and a storage module 609, configured to store the extracted voiceprint information into the local voiceprint database when the extracted voiceprint information does not match any piece of voiceprint information stored in the local voiceprint database.

Figure 8:
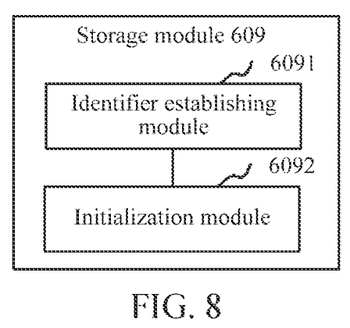
FIG. 8 is a structural block diagram of a storage module of an electronic device in another embodiment.

Referring to FIG. 8, in one of the embodiments, the storage module 609 includes:

an identifier establishing module 6091, configured to establish a user identifier of the extracted voiceprint information; and an initialization module 6092, configured to store the extracted voiceprint information and the corresponding user identifier in association into the local voiceprint database, and initialize a priority level of the user identifier to an initial level.

In one of the embodiments, the electronic device further includes a level increasing module.

The level increasing module is configured to increase the priority level of the user identifier corresponding to the extracted voiceprint information by a preset level when the extracted voiceprint information successfully matches the voiceprint information stored in the local voiceprint database.

In one of the embodiments, the voiceprint information stored in the local voiceprint database corresponds to a user identifier.

The to-be-matched voiceprint information obtaining module 603 is configured to obtain, according to a preset level order of a priority level of the user identifier, in the local voiceprint database, voiceprint information corresponding to an unmatched user identifier as to-be-matched voiceprint information.

In one of the embodiments, the preset level order includes a descending order of priority levels or an ascending order of priority levels.

In one of the embodiments, the electronic device further includes a prompt module.

The prompt module is configured to provide recognition error prompt information when the combined semantic information does not satisfy the preset rule, and there is no unmatched voiceprint information in the local voiceprint database.

In one of the embodiments, the electronic device further includes an information keyword extraction module.

The information keyword extraction module is configured to extract one or more keywords of the semantic information, and extract one or more keywords of the combined semantic information.

The segmenting and voiceprint obtaining module 602 determines that the semantic information does not satisfy the preset rule when the semantic information does not satisfy a preset grammatical rule, the keywords of the semantic information do not exist in one lexicon at the same time, or an instruction corresponding to the one or more keywords of the semantic information does not exist in a local instruction library.

The foregoing recognition result determining module 606 determines that the combined semantic information satisfies the preset rule that when the combined semantic information satisfies the preset grammatical rule, the keywords of the combined semantic information exist in one lexicon at the same time, and an instruction corresponding to the keywords of the combined semantic information exist in the local instruction library.

In one of the embodiments, the foregoing semantic information determining module 601 includes:

a recognition module, configured to perform speech recognition on to-be-recognized voice information, to obtain the semantic information;

or an information sending module, configured to send to-be-recognized voice information to a cloud server; and a semantic information obtaining module, configured to receive a recognition result of performing, by the cloud server, speech recognition on the to-be-recognized voice information, and use the recognition result as semantic information.

In an embodiment, an electronic device includes a memory and a processor, the memory stores computer readable instructions, and the computer readable instructions, when being executed by the processor, enables the processor to perform the following steps: obtaining captured to-be-recognized voice information, and determining semantic information of the to-be-recognized voice information; segmenting the to-be-recognized voice information to obtain respective voice segments when the semantic information does not satisfy a preset rule, and extracting voiceprint information of the respective voice segments; obtaining a piece of unmatched voiceprint information from a local voiceprint database as to-be-matched voiceprint information when there is unmatched voiceprint information in the local voiceprint database; matching the voiceprint information of the respective voice segments with the to-be-matched voiceprint information to determine, in the voiceprint information of the respective voice segments, filtered voiceprint information that successfully matches the to-be-matched voiceprint information; combining voice segments corresponding to each piece of filtered voiceprint information to obtain combined voice information, and determining combined semantic information of the combined voice information; and using the combined semantic information as a speech recognition result when the combined semantic information satisfies the preset rule.

In one of the embodiments, the computer readable instructions further enables the processor to perform the following step: returning, when the combined semantic information does not satisfy the preset rule, to the step of obtaining a piece of unmatched voiceprint information from a local voiceprint database as to-be-matched voiceprint information when there is unmatched voiceprint information in the local voiceprint database.

In one of the embodiments, the computer readable instructions further enable the processor to perform the following step: using the semantic information as a speech recognition result when the semantic information satisfies the preset rule.

In one of the embodiments, the computer-readable instructions further enable the processor to perform the following steps: extracting voiceprint information of the to-be-recognized voice information after the using the semantic information as a speech recognition result when the semantic information satisfies the preset rule; comparing the extracted voiceprint information with respective pieces of voiceprint information stored in the local voiceprint database; and storing the extracted voiceprint information into the local voiceprint database when the extracted voiceprint information does not match any piece of voiceprint information stored in the local voiceprint database.

In one of the embodiments, the computer-readable instructions further enable the processor to perform the following step: a manner of storing the voiceprint information into the local voiceprint database includes establishing a user identifier of the extracted voiceprint information; and storing the extracted voiceprint information and the corresponding user identifier in association into the local voiceprint database, and initializing a priority level of the user identifier to an initial level.

In one of the embodiments, the computer-readable instructions further enable the processor to perform the following step: increasing the priority level of the user identifier corresponding to the extracted voiceprint information by a preset level when the extracted voiceprint information successfully matches the voiceprint information stored in the local voiceprint database.

In one of the embodiments, the voiceprint information stored in the local voiceprint database corresponds to a user identifier.

The computer-readable instructions further enable the processor to perform the following step: a manner of obtaining a piece of unmatched voiceprint information from the local voiceprint database as to-be-matched voiceprint information may include: obtaining, according to a preset level order of a priority level of the user identifier, in the local voiceprint database, voiceprint information corresponding to an unmatched user identifier as to-be-matched voiceprint information.

In one of the embodiments, the preset level order may include a descending order of priority levels or an ascending order of priority levels.

In one of the embodiments, the computer-readable instructions further enable the processor to perform the following step: providing recognition error prompt information when the combined semantic information does not satisfy the preset rule, and no unmatched voiceprint information exists in the local voiceprint database.

In one of the embodiments, the computer-readable instructions further enable the processor to perform the following step: after semantic information of the to-be-recognized voice information is determined, and before the to-be-recognized voice information is segmented, the method further includes a step of: extracting one or more keywords of the semantic information.

It is determined that the semantic information does not satisfy the preset rule when the semantic information does not satisfy a preset grammatical rule, the keywords of the semantic information do not exist in one lexicon at the same time, or an instruction corresponding to the one or more keywords of the semantic information does not exist in a local instruction library.

In this embodiment, the computer-readable instructions further enable the processor to perform the following step: after combined semantic information of the combined voice information is determined, and before the combined semantic information is used as a speech recognition result, the method further includes a step of: extracting one or more keywords of the combined semantic information.

It is determined that the combined semantic information satisfies the preset rule that when the combined semantic information satisfies the preset grammatical rule, the keywords of the combined semantic information exist in one lexicon at the same time, and an instruction corresponding to the keywords of the combined semantic information exist in the local instruction library.

In one of the embodiments, the computer-readable instructions further enable the processor to perform the following step: a manner of determining semantic information of the to-be-recognized voice information may include: performing speech recognition on the to-be-recognized voice information, to obtain the semantic information.

In one of the embodiments, the computer-readable instructions further enable the processor to perform the following step: a manner of determining semantic information of the to-be-recognized voice information may include:

sending the to-be-recognized voice information to a cloud server; and receiving a recognition result of performing, by the cloud server, speech recognition on the to-be-recognized voice information, and using the recognition result as semantic information.

In the foregoing electronic device, semantic information of to-be-recognized voice information is first determined; when the semantic information does not satisfy a preset rule, it indicates that the recognized semantic information may be inaccurate, and in this case, the to-be-recognized voice information is segmented to obtain respective voice segments, and voiceprint information of the respective voice segment is extracted; a piece of unmatched voiceprint information is obtained from a local voiceprint database as to-be-matched voiceprint information when there is unmatched voiceprint information in the local voiceprint database, to provide a basis for subsequent voiceprint matching, that is, provide to-be-matched voiceprint information of a single user for voiceprint matching; then, the voiceprint information of the respective voice segments is matched with the to-be-matched voiceprint information to determine, in the voiceprint information of the respective voice segments, filtered voiceprint information that successfully matches the to-be-matched voiceprint information; that is, voiceprint information of the single user matching the foregoing to-be-matched voiceprint information is filtered from the voiceprint information of the respective voice segments; voice segments corresponding to each piece of filtered voiceprint information are combined to obtain combined voice information, that is, to obtain combined voice information of the single user, and the combined voice information is recognized to obtain combined semantic information, to obtain a meaning expressed by the single user, to improve recognition accuracy, whether the combined semantic information satisfies the preset rule also needs to be determined, and if the combined semantic information satisfies the preset rule, it indicates that an accurately recognized meaning is obtained, that is, a meaning that the user wants to express is accurately obtained, and in this case, the combined semantic information is used as a speech recognition result, thereby improving speech recognition accuracy.

A person of ordinary skill in the art may understand that all or some of the processes in the methods of the foregoing embodiments may be implemented by a computer program instructing relevant hardware. The computer program may be stored in a non-volatile computer readable storage medium. For example, in the embodiments of the present invention, the computer program may be stored in a computer storage medium, and is executed by at least one processor in the computer system, to implement the process including the foregoing method embodiments. The computer storage medium may be a magnetic disk, a compact disc, a read-only memory (ROM), a random access memory (RAM), or the like.

Technical features of the foregoing embodiments may be randomly combined. To make description concise, not all possible combinations of the technical features in the foregoing embodiments are described. However, as long as combinations of these technical features do not contradict each other, it should be considered that the combinations all fall within the scope recorded by this specification.

The above embodiments only express several implementations of the present disclosure, which are described specifically and in detail, but cannot be construed as a limitation to the patent scope of the present disclosure. It should be pointed out that for several deformations and improvements that may also be made by a person of ordinary skill in the art without departing from the idea of the present disclosure all fall within the protection scope of the present disclosure. Therefore, the protection scope of the present invention patent shall be subject to the appended claims.

What is claimed is:

1. A speech recognition method comprising:
   segmenting captured voice information to obtain a plurality of voice segments, and extracting voiceprint information from the plurality of voice segments;
   matching the voiceprint information of the voice segments with first stored voiceprint information to determine a set of filtered voice segments of the plurality of voice segments that have voiceprint information that successfully matches the first stored voiceprint information;

combining the set of filtered voice segments to obtain combined voice information, and determining combined semantic information of the combined voice information;
determining whether the combined semantic information satisfies a preset rule; and
in response to determining that the combined semantic information satisfies the preset rule, using the combined semantic information as a speech recognition result.

2. The speech recognition method according to claim 1, further comprising:
matching the voiceprint information of the voice segments with second stored voiceprint information to determine a second set of filtered voice segments of the plurality of voice segments that have voiceprint information that successfully matches the second stored voiceprint information;
combining the second set of filtered voice segments to obtain second combined voice information, and determining second combined semantic information of the second combined voice information; and
determining whether the second combined semantic information satisfies the preset rule.

3. The speech recognition method according to claim 2, further comprising:
determining that the second combined semantic information does not satisfy the preset rule prior to matching the voiceprint information of the voice segments with the first stored voiceprint information.

4. The speech recognition method according to claim 1, further comprising:
prior to segmenting the captured voice information:
determining semantic information of the non-segmented captured voice information; and
determining that the semantic information of the non-segmented captured voice information does not satisfy the preset rule.

5. The speech recognition method according to claim 1, wherein the set of filtered voice segments excludes at least one of the plurality of voice segments.

6. The speech recognition method according to claim 1, further comprising:
raising a priority level of a user identifier corresponding to the first stored voiceprint information by a preset level in response to determining that the combined semantic information satisfies the preset rule.

7. The speech recognition method according to claim 1, wherein the first stored voiceprint information is stored in a local voiceprint database, and wherein the first stored voiceprint information corresponds to a user identifier; and
wherein the method further comprises:
obtaining, according to a preset level order of a priority level of the user identifier, the first stored voiceprint information corresponding to the user identifier from the local voiceprint database.

8. The speech recognition method according to claim 1, wherein determining whether the combined semantic information satisfies the preset rule further comprises:
extracting a first keyword from the combined semantic information; and
determining that the combined semantic information satisfies the preset rule when the combined semantic information satisfies the preset grammatical rule, the first keyword exists in the lexicon, and an instruction corresponding to the first keyword exists in an instruction library.

9. An electronic device, comprising: a memory and a processor, the memory storing computer-readable instructions, and the computer-readable instructions, when executed by the processor, cause the processor to perform the following:
segmenting captured voice information to obtain a plurality of voice segments, and extracting voiceprint information from the plurality of voice segments;
matching the voiceprint information of the voice segments with first stored voiceprint information to determine a set of filtered voice segments of the plurality of voice segments that have voiceprint information that successfully matches the first stored voiceprint information;
combining the set of filtered voice segments to obtain combined voice information, and determining combined semantic information of the combined voice information;
determining whether the combined semantic information satisfies a preset rule; and
in response to determining that the combined semantic information satisfies the preset rule, using the combined semantic information as a speech recognition result.

10. The electronic device according to claim 9, wherein the computer-readable instructions further enable the processor to perform the following:
matching the voiceprint information of the voice segments with second stored voiceprint information to determine a second set of filtered voice segments of the plurality of voice segments that have voiceprint information that successfully matches the second stored voiceprint information;
combining the second set of filtered voice segments to obtain second combined voice information, and determining second combined semantic information of the second combined voice information; and
determining whether the second combined semantic information satisfies the preset rule.

11. The electronic device according to claim 10, wherein the computer-readable instructions further enable the processor to perform the following:
determining that the second combined semantic information does not satisfy the preset rule prior to matching the voiceprint information of the voice segments with the first stored voiceprint information.

12. The electronic device according to claim 9, wherein the computer-readable instructions further enable the processor to perform the following:
prior to segmenting the captured voice information:
determining semantic information of the non-segmented captured voice information; and
determining that the semantic information of the non-segmented captured voice information does not satisfy the preset rule.

13. The electronic device according to claim 9, wherein the set of filtered voice segments excludes at least one of the plurality of voice segments.

14. The electronic device according to claim 9, wherein the computer-readable instructions further enable the processor to perform the following:
increasing a priority level of a user identifier corresponding to the first stored voiceprint information by a preset level in response to determining that the combined semantic information satisfies the preset rule.

15. The electronic device according to claim 9, wherein the first stored voiceprint information is stored in a local voiceprint database, and wherein the first stored voiceprint information corresponds to a user identifier; and wherein the computer-readable instructions further enable the processor to perform the following:

obtaining, according to a preset level order of a priority level of the user identifier, the first stored voiceprint information corresponding to the user identifier from the local voiceprint database.

16. The electronic device according to claim 9, wherein the computer-readable instructions further enable the processor to perform determining whether the combined semantic information satisfies the preset rule by performing the following:

extracting a first keyword from the combined semantic information; and determining that the combined semantic information satisfies the preset rule when the combined semantic information satisfies the preset grammatical rule, the first keyword exists in the lexicon, and an instruction corresponding to the first keyword exists in an instruction library.

17. A non-transitory computer storage medium, storing a computer program that when executed by a processor, causes the processor to perform the following:

segmenting captured voice information to obtain a plurality of voice segments, and extracting voiceprint information from the plurality of voice segments;

matching the voiceprint information of the voice segments with first stored voiceprint information to determine a set of filtered voice segments of the plurality of voice segments that have voiceprint information that successfully matches the first stored voiceprint information;

combining the set of filtered voice segments to obtain combined voice information, and determining combined semantic information of the combined voice information;

determining whether the combined semantic information satisfies a preset rule; and in response to determining that the combined semantic information satisfies the preset rule, using the combined semantic information as a speech recognition result.

18. The non-transitory computer storage medium according to claim 17, wherein the computer program further causes the processor to perform the following:

prior to segmenting the captured voice information:

determining semantic information of the non-segmented captured voice information; and determining that the semantic information of the non-segmented captured voice information does not satisfy the preset rule.

19. The non-transitory computer storage medium according to claim 18, wherein the set of filtered voice segments excludes at least one of the plurality of voice segments.

20. The non-transitory computer storage medium according to claim 17, wherein the computer program further causes the processor to perform determining whether the combined semantic information satisfies the preset rule by performing the following:

extracting a first keyword from the combined semantic information; and determining that the combined semantic information satisfies the preset rule when the combined semantic information satisfies the preset grammatical rule, the first keyword exists in the lexicon, and an instruction corresponding to the first keyword exists in the local instruction library.

\* \* \* \* \*